Feb. 9, 1954  C. VINCENT  2,668,742
JOURNAL BOX LUBRICATOR
Filed June 26, 1952  2 Sheets-Sheet 1
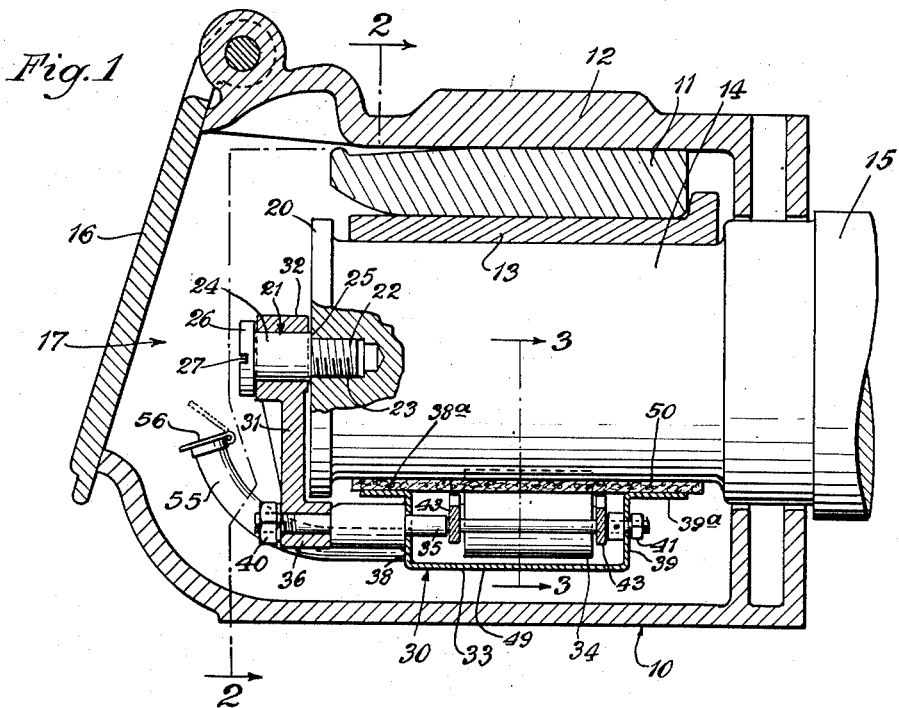
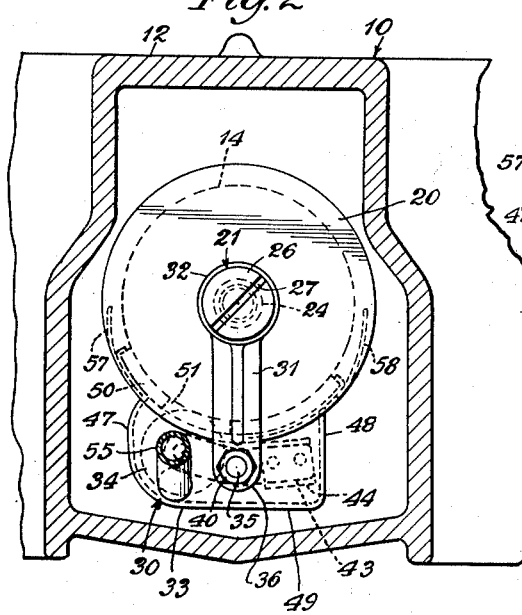
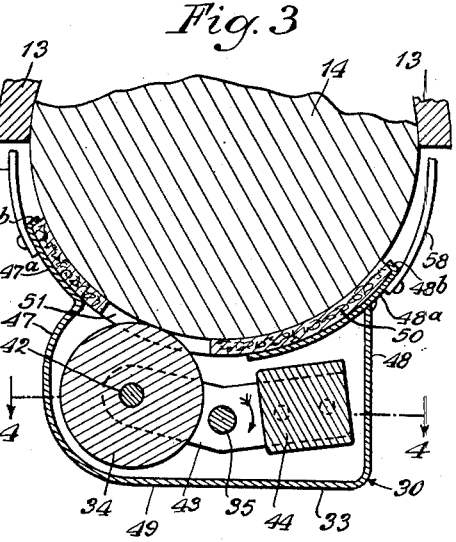
Inventor
Carl Vincent
by Parker & Carter
Attorneys Feb. 9, 1954    C. VINCENT    2,668,742
JOURNAL BOX LUBRICATOR
Filed June 26, 1952    2 Sheets-Sheet 2
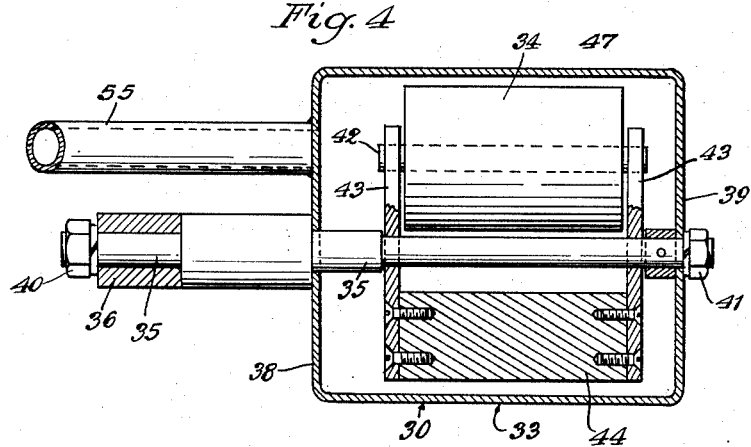
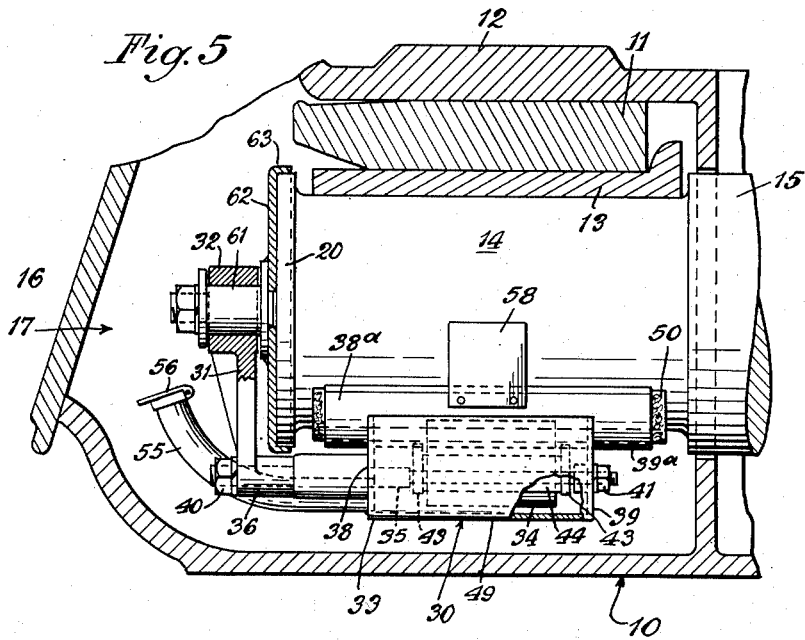
Inventor
Carl Vincent
by Parker & Carter
Attorneys Patented Feb. 9, 1954

2,668,742

UNITED STATES PATENT OFFICE 2,668,742

JOURNAL BOX LUBRICATOR

Carl Vincent, Chicago, Ill.

Application June 26, 1952, Serial No. 295,688

2 Claims. (Cl. 308—91)

This invention relates to improvements in lubricating devices for journal boxes of the general type which have been standard equipment on freight cars for many years.

Journal boxes of the type referred to consist essentially of a housing having a half-cylindrical metal bearing piece-fixed in the upper portion thereof for engaging the upper half of the bearing surface of the axle, leaving the lower half of the axle bearing surface exposed for application of lubricant by suitable oiling means disposed in the lower part of the journal box.

Many different lubrication means have heretofore been proposed for use in such journal boxes but the most common means still seems to be waste material stuffed in the box to feed oil by capillary action from the lower part of the box to the axle bearing surface. The waste material usually employed is much the same as was used decades ago, excepting that fine wires are often mixed therewith to insure continuous yielding engagement with the bearing surface.

Among other lubricating means heretofore proposed for journal boxes may be mentioned roller feeds for carrying the lubricating oil from the oil sump in the bottom of the box up to the bearing surface of the axle and also various forms of wiping devices employing capillary action. Most all of such previous devices, however, rely upon some form of spring tension means for retaining contact between the oiling means and the rotating bearing surface, which have generally been found unsatisfactory due to the relatively large amount of play, both vertically and longitudinally, usually permitted between the rotating bearing surface and the journal box, which causes frequent breakage of such spring devices.

In carrying out my invention, the lubricating device is supported directly on and movable with the axle and its various shifting movements within the journal box. More specifically, the device is pivotally supported on the outer end of the axle independently of the journal box, and includes a downwardly and then inwardly extending cradle which maintains a lubricant feeding means in direct contact along the under face of the axle bearing independently of any other supporting means in the journal box. The pivotal support for the cradle has detachable connection with the end of the axle so that the entire lubricating device may be inserted in or withdrawn from the open end of the journal box as the unit, so as to facilitate initial installation and quick repair or replacement, when necessary.

A further object of the invention is to provide counter-balancing means operable by gravity rather than spring tension to maintain a lubricant feeding roller in proper engagement with the bearing surface of the axle.

A still further object is to provide a lubricating device of the character above mentioned, including a self-contained oil receptacle and feeding means, which is enclosed against ingress of dust or dirt such as usually finds its way into the journal box.

Other objects and advantages of the invention will appear from time to time as the following description proceeds.

The invention may best be understood by reference to the accompanying drawings, in which:

Figure 1 is a vertical section of a journal box with one embodiment of my improved form of lubricating device mounted therein;

Figure 2 is a detail section taken on line 2—2 of Figure 1;

Figure 3 is an enlarged detail section taken on line 3—3 of Figure 1;

Figure 4 is a detail section taken on line 4—4 of Figure 3 and drawn to the same scale as the latter figure;

Figure 5 is a vertical section of a journal box illustrating a modified form of supporting attachment for the lubricating device.

Referring now to details of the embodiment shown in Figures 1 to 4, a journal box 10 of conventional form has the usual bearing support 11 engaging its upper wall 12 with a semi-circular bearing piece 13 engaging the upper face of the end bearing surface 14 of axle 15 inwardly of its conventional end flange 20. The journal box also has the usual hinged door 16 for the end opening 17.

My improved form of lubricating device is rotatably supported on the outer end of the axle. In the embodiment shown in Figures 1 and 2, the supporting means consists of a pivot stud 21 having a reduced portion 22 secured in a threaded bore 23 machined in the outer end surface of the axle concentric therewith. As is well known, axles usually have machined centering points at their outer ends, which points can be used as centers for the larger threaded bore 23 which receives the reduced portion 22 of stud 21.

The stud 21 has an enlarged bearing surface 24 with an inner shoulder 25 adapted to engage the end surface of the axle when the stud is screwed home in the latter. Said stud also has a head 26 with a slot 27 adapted for engagement by a screw driver.

A cradle, indicated generally at 30, is rotatably supported on the pivot stud 21 by a depending bracket 31 having a bearing sleeve 32 rotatably mounted on the bearing surface 24 of stud 21. The depending bracket 31 is adapted to hang downwardly below and inwardly of the flanged end portion 20 of the axle for connection to the main portion of cradle 30. The latter portion includes an oil receptacle 33 having an oil feed roller 34 supported therein for engagement with the under surface of the end bearing surface 14. In the form shown herein, the oil receptacle 33 is connected to the lower end of the bracket 31 by a rod 35, the outer end of which passes through a cylindrical inner projecting sleeve 36 formed integrally with said bracket. From thence, said rod passes longitudinally through the receptacle 30, with its rear end projecting through the outer wall 38 of said receptacle. The outer end of the rod 35 has a nut 40 threaded thereon in engagement with the sleeve 36, and the inner end of the rod 35 has a similar nut 41 threaded thereon for engagement with the adjacent wall 39 of the receptacle 33. When the parts just described are assembled, the bracket 31 and the oil receptacle 33 are maintained in fixed relation to each other and supported on the axle independently of the journal box, but with the axle free to rotate as usual by reason of the pivotally supported connection of bracket 31 on the stud 21.

The feed roller 34 has an axle 42 supported for rotation at opposite ends on a pair of spaced arms 43, 43. The arms 43, 43 extend transversely of receptacle 33 below the main axle 15 and are pivotally supported on the rod 35. A counter-weight 44 is carried on the ends of the arms 43 opposite the roller 34 so that the upper surface of the roller is normally urged against the under surface of the main axle bearing surface 14 at all times, while the lower part of the roller is immersed in a supply of oil partially filling the receptacle 33.

The receptacle 33 is provided with means for fully enclosing the oil therein against ingress of dirt and dust, while the roller 34 maintains contact with the main axle bearing 14. For this purpose, the side walls 47 and 48 of the receptacle extend upwardly from the bottom wall 49 to levels closely adjacent the main axle bearing surface 14 and, from thence, said side walls have outwardly extending arcuate flanges 47a and 48a, respectively, and conforming in general with the shape of the axle. The inner and outer end walls 38 and 39 of the receptacle are also provided with outwardly extending flanges 38a and 39a, respectively. A sheet of fabric 50 of suitable absorbent material, such as felt, is inserted between the flanged portions 38a, 39a, 47a and 48a and the adjacent surface of the main axle bearing surface 14. Said sheet has a cut-out portion 51 of suitable size and shape to permit contact of the feed roller 34 with said axle bearing surface, as clearly shown in Figure 3. The sheet 50 is held against rotational movement by terminal flanges 47b and 48b along the outer edges of the side flanges 47a and 48a, respectively.

Oil is introduced into the enclosed receptacle 33 through a tube 55 extending from the front wall 38 of said receptacle to one side of the depending bracket 31 and curving upwardly along said bracket with a suitable hinged closure 56 at its outer end for permitting oil to be supplied to the receptacle, as required.

Excessive rotation of the oiling device relative to the axle 15 on which it is mounted may be controlled by suitable stop means, herein consisting of brackets 57, 58 secured to the outer ends of side flanges 47, 48, respectively, of the receptacle 33, and projecting upwardly to levels normally spaced from the bottom edges of the main bearing piece 13 so as to engage the latter when the oiling device swings in one direction or the other. Under normal operating conditions, however, the oiling device will hang by gravity in a substantially centered position.

Figure 5 shows a variant form of supporting means for the oiling device. In this form, the stud 61, corresponding generally in function to the stud 21 of the form heretofore described in connection with Figures 1 to 4, is fixed as by welding to the center of a disc 62, having a narrow inwardly projecting flange 63 around its periphery. The flange 63 is of such diameter and width so as to be retained by friction when fitted over the end flange 20 of the axle 15. In practice, the flange 63 can be readily fitted on the end of the axle by the usual preheating or "sweating" method, so that the oiling device can be applied to the end of a standard axle without requiring the use of an additional boring and threading operation for securing the pivotal stud to said axle.

Among the advantages of my improved form of lubricating device over oiling devices heretofore employed for the same purpose is the arrangement whereby the oiling device is carried bodily on and movable with the axle independently of any support from the adjacent portions of the axle box. It is well known that axles have considerable play with respect to their upper main bearing, so that, when the car is being operated over rough roadway, the axle often becomes separated, or "bounces" a substantial distance from its main bearing. Accordingly, some means is required to maintain conventional as well as especially designed oiling devices in operative engagement with the axle. Such means heretofore has usually included some form of spring means, supported by or upon the walls of the axle box. For example, when waste stuffing material is used in the axle box, fine spring wires are mixed with the waste to insure continuous yielding engagement with the bearing surface. Many other forms of oiling devices have also been proposed, most of which include some form of spring yielding means supported in the axle box to maintain engagement with the axle bearing surface. Such spring yielding means are a frequent cause of trouble, due to breakage under constant flexing during normal usage.

It will be observed that with my improved lubricating device such spring yielding means are not employed. The entire device is mounted directly on the main axle, for movement therewith at all times, and the feed roller 34 is maintained in engagement with the main bearing surface by counterbalancing means operating by gravity.

As a further advantage of my device, the oil is fully enclosed within the receptacle 33 so that dust and dirt cannot get into the oil compartment. The oil is fed to the main bearing surface by the roller 34 and then is spread longitudinally throughout the entire length of the bearing surface by capillary action through the absorbent sheet 50, which is maintained under slight yielding compression against the bearing surface by reason of the fact that the entire oiling device is supported for bodily movement with the axle, as previously described.

My improved lubricating device is adapted for quick attachment to, or detachment from, a standard journal box, so that it can be readily substituted for the conventional lubricating devices. Also, the device can be quickly removed for replacement or repair, either in the shops, or even on the road if necessary.

Although I have shown and described certain embodiments of my invention, it will be understood that I do not wish to be limited to the exact constructions shown and described, but that various changes and modifications may be made without departing from the spirit and scope of the invention as defined in the appended claims.

I claim:

1. In a journal box comprising a housing, an axle extending into one end of said housing with a bearing portion within the latter, and a bearing member in said housing in bearing engagement with the upper face of said bearing portion, the combination of a support fixed to the outer end of said axle and rotatable therewith, a cradle having one end pivotally mounted on said support and extending downwardly therefrom and thence along the under face of said bearing portion below said bearing member, lubricating means supported on said cradle in feeding relation with said under face of the axle bearing portion, said lubricating means including an oil receptacle mounted on the cradle, and a roller also supported on the cradle in engagement with the axle bearing and adapted to transfer lubricant from the oil receptacle to the axle bearing surface, said roller being pivotally mounted on the cradle to swing on an axis parallel to the axis of the axle and having counterbalancing means tending to maintain said roller by gravity in engagement with the bearing surface.

2. The structure in accordance with claim 1, wherein said cradle is supported on the axle independent of any auxiliary support from the journal box.

CARL VINCENT.

References Cited in the file of this patent

UNITED STATES PATENTS

| Number | Name | Date |
|---|---|---|
| 812,915 | Berry | Feb. 20, 1906 |

FOREIGN PATENTS

| Number | Country | Date |
|---|---|---|
| 260,237 | Italy | Sept. 11, 1928 |